US006279829B1

(12) United States Patent
Hems et al.

(10) Patent No.: US 6,279,829 B1
(45) Date of Patent: Aug. 28, 2001

(54) METHOD AND APPARATUS FOR REDUCING BANDWIDTH LIMITED NOISE IN AN OPTICAL SCANNER

(75) Inventors: Randall K. Hems, Penfield, NY (US); Robert W. Rudeen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/328,382

(22) Filed: Jun. 9, 1999

(51) Int. Cl.[7] .................................................. G06K 7/10
(52) U.S. Cl. ...................................... 235/462.01; 235/454
(58) Field of Search .............................. 235/454, 462.01, 235/455, 472.01

(56) References Cited

U.S. PATENT DOCUMENTS

| | | | |
|---|---|---|---|
| 3,774,014 | * 11/1973 | Berier ................................. | 235/61.11 |
| 4,591,242 | * 5/1986 | Broockman et al. ................ | 350/3.71 |
| 5,281,800 | 1/1994 | Pelton et al. ........................ | 235/462 |
| 5,333,045 | * 7/1994 | Gusmeroli et al. .................. | 356/345 |
| 5,778,016 | * 7/1998 | Sucha et al. ........................ | 372/38 |
| 5,821,978 | * 10/1998 | Yamamoto et al. ................ | 347/235 |
| 5,852,286 | 12/1998 | Coleman ............................ | 235/462 |
| 6,072,921 | * 6/2000 | Frederick et al. .................... | 385/12 |
| 6,078,390 | * 6/2000 | Bengtsson ........................... | 356/318 |

* cited by examiner

Primary Examiner—Karl Frech
(74) Attorney, Agent, or Firm—Foley & Lardner

(57) ABSTRACT

An optical scanning system includes a laser pulser configured to output light at a predetermined duty cycle having an on time and an off time. The system also includes a receiver that receives light at the predetermined duty cycle, where the receiver includes an ambient light measuring and analyzing unit for analyzing received ambient light during the off time. The ambient light measuring and analyzing unit outputs a signal to the laser pulser that includes information as to characteristics of the received ambient light. The laser pulser operates at a modulating frequency that is separate from a frequency band of the received ambient light.

6 Claims, 17 Drawing Sheets

METHOD AND APPARATUS FOR REDUCING BANDWIDTH LIMITED NOISE IN AN OPTICAL SCANNER

BACKGROUND OF THE INVENTION

1. Field of the Invention

The present invention relates to reducing bandwidth limited noise in an optical scanner; in particular, in a bar code scanner.

2. Description of the Related Art

U.S. Pat. No. 5,852,286, which issued to Ed Coleman, and which is assigned to PSC Inc., and which is incorporated in its entirety herein by reference, discloses a system and method for reducing bandwidth limited noise in a bar code scanning system. FIGS. 1 through 10 provide details of such a system and method. In such a system and method, a duty cycle of a laser light source is controlled such that it repeatedly is "on" for a certain period of time, and then "off" for a certain period of time. Furthermore, positive and negative gains of a demodulator circuit at a receive side are controlled in accordance with the duty cycle. As a result, the elements of a received signal that are contributed by the ambient light are substantially canceled out.

Thus, the system and method described above reduces bandwidth limited noise by modulating the light and then synchronously controlling the demodulation in the signal processing of the photodetector signal. Also, the duty cycle of the pulsing can be varied, along with the gains in the demodulation portion.

While the system and method described above is useful for reducing the noise caused by ambient light, such a system and method may not be so useful when other optical scanners are utilized in a same environment, for systems that do not operate in a pulsed manner, or for systems operating in an environment where the ambient light characteristics are unknown or varying.

SUMMARY OF THE INVENTION

An object of the invention is to provide a system and method for optical scanning of an object, using a multiple scanner system in which a laser pulser of a first system operates at a first frequency and where a laser pulser of a second system operates at a second frequency different from the first frequency.

Another object of the invention is to provide a single scanner with multiple light sources, where the single scanner includes a first light source and a first laser pulser, and a second light source that may contain a second laser pulser. The single scanner has one photodetector for receiving light from the first and second light sources. The first and second pursers operate and a rate f1 and a rate f2, respectively, where f1 is not equal to f2, and f2 may equal zero Hertz, corresponding to a non-pulsed source.

Yet another object of the invention is to provide a single scanner with a single light source, and where the modulation frequency of the laser pulser can be adjusted via hardware or software. The adjusting of the modulation frequency would also result in a commensurate adjustment of a bandwidth of a filter stage in a receive portion of the system. This system works well when noise frequencies are known and unchanging.

Still another object of the invention is to provide a single scanner with a single light source at multiple modulation frequencies, and where the modulation frequency varies in a predetermined manner. The filter stage bandwidth also varies in a corresponding manner. This system works well when noise frequencies are not known or change frequently.

Still yet another object of the invention is to provide a single light source with closed loop control of modulation frequencies, and where the modulation frequency of the laser pulser is varied based on frequency analysis and measurement of the ambient noise signal. The scanner is configured to optimize the modulation frequency to yield an optimal signal-to-noise ratio, and the scanner is configured to respond in real time to changes in the ambient noise frequency.

BRIEF DESCRIPTION OF THE DRAWINGS

These and other objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

The present invention describes various improvements to the bandwidth limited noise reduction system and method disclosed in U.S. Pat. No. 5,852,286, issued to Ed Coleman and assigned to PSC Inc.

Figure 11:
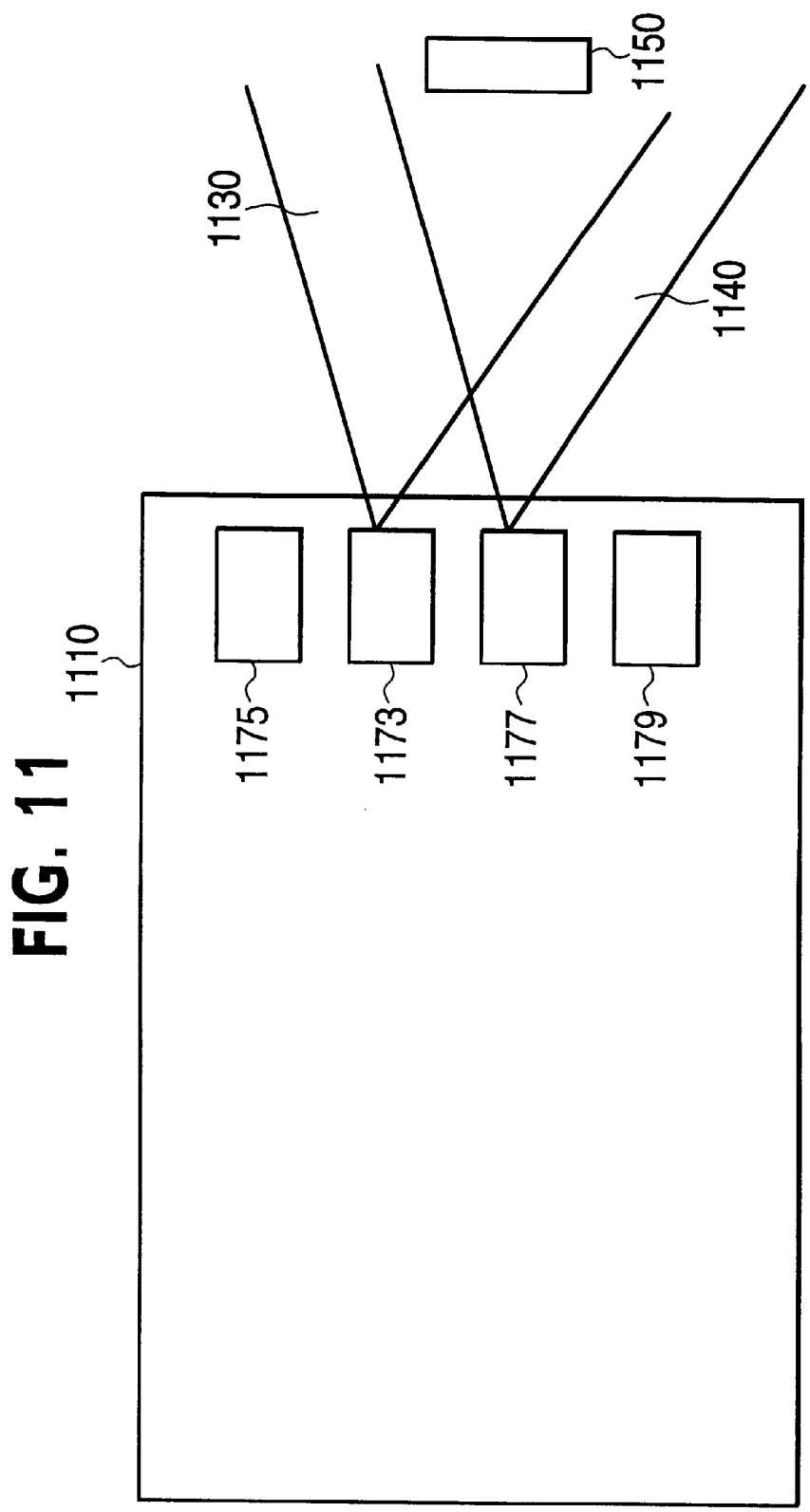
FIG. 11 is a block diagram of an optical scanner according to a first embodiment of the invention.

According to a first embodiment of the present invention, a bar code scanner includes a plurality of light sources that provide respective outputs at different frequencies. For example, as shown in FIG. 11, the optical scanner 1110 includes a first laser light source 1173 that outputs laser light at a first modulation frequency f1, and a second laser light source 1177 that outputs laser light at a second modulation frequency f2 that is different from f1. The fields of view 1130, 1140 of the two light sources overlap with each other, and may even be set to the same field of view. The target indicia 1150 will be positioned within one or more of the fields of view.

In the first embodiment, signal processing electronics are used to split out the signals from the different laser light. In particular, the signal processing electronics at a collector-side portion of the scanner has a first signal processing filtering unit 1175 that detects received signals at the first modulation frequency f1, and has a second signal processing filtering unit 1179 that detects received signals at the second modulation frequency f2. In this way, and by appropriate choice of the modulation frequencies f1, f2, etc., multiple beams (e.g., two or more) with different optical characteristics can be detected with a single collection system. These different optical characteristics may include different beam waist locations, different beam sizes, and different wavelengths, for example. The choice of f1 and f2 should preferably be made such that one is not an integer multiple of the other.

In the first embodiment, the other beams output by the same scanner look like optical noise to the beam of interest at the receiving side, and so the different modulation frequencies perform the same task of noise elimination as described in the on/off duty cycle embodiments described earlier, but in a different way. Furthermore, since each output source has its own modulation frequency, there is no cross-talk between scanning beams, since any cross-talk is treated like other ambient light noise, and is greatly reduced and/or eliminated by the synchronous demodulation.

An asynchronous narrow band detection method, such as that used in AM radio receivers, can also be employed in a multiple source system of the first embodiment, although it may not have the reduction in bandwidth noise afforded by the synchronous modulation technique.

Figure 6:
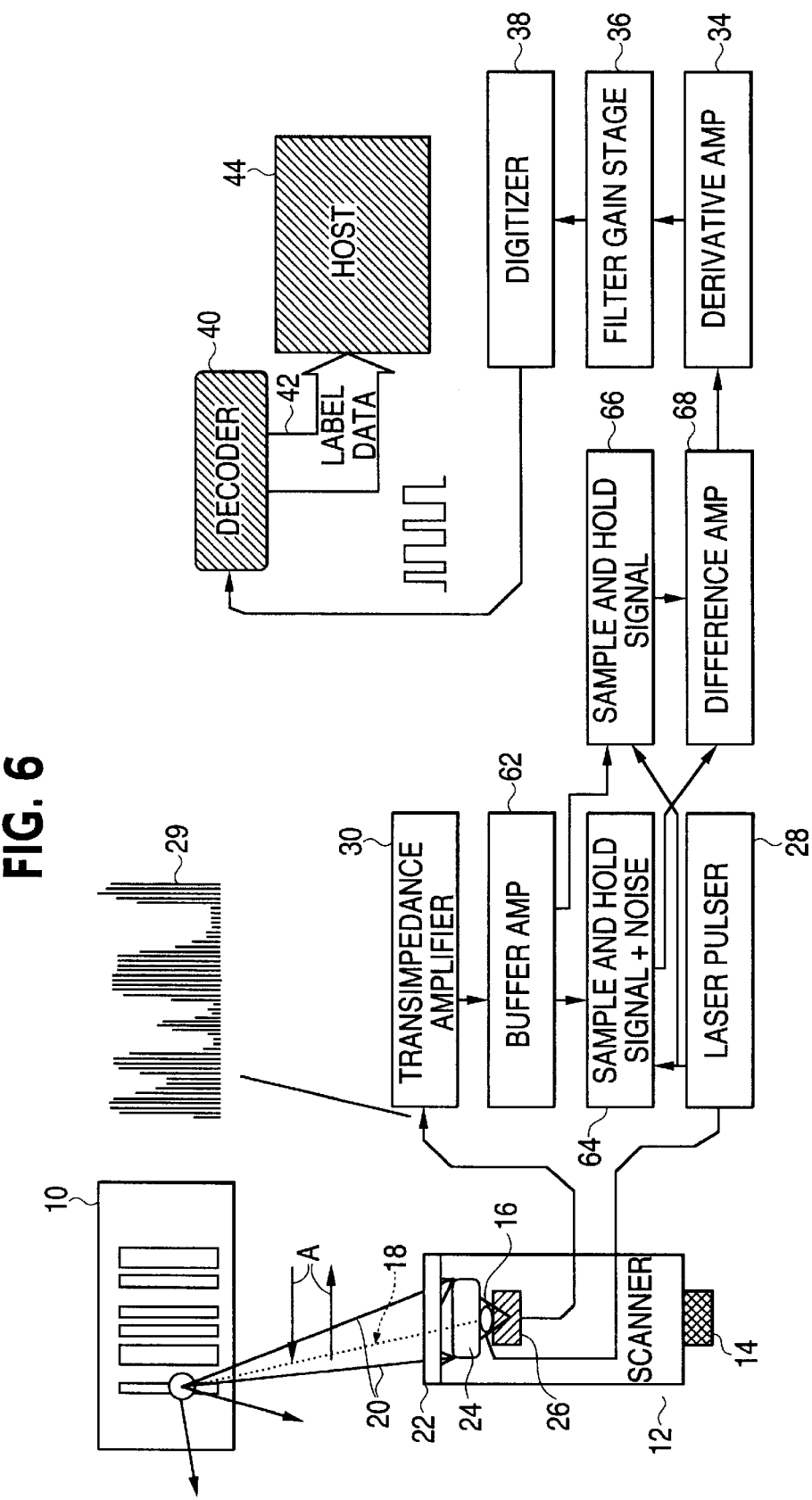
FIG. 6 is block diagram of another bar code scanner system that reduces noise via pulsing of a laser and commensurate pulsing of a receiver portion, and which includes a sampling unit.
Figure 7:
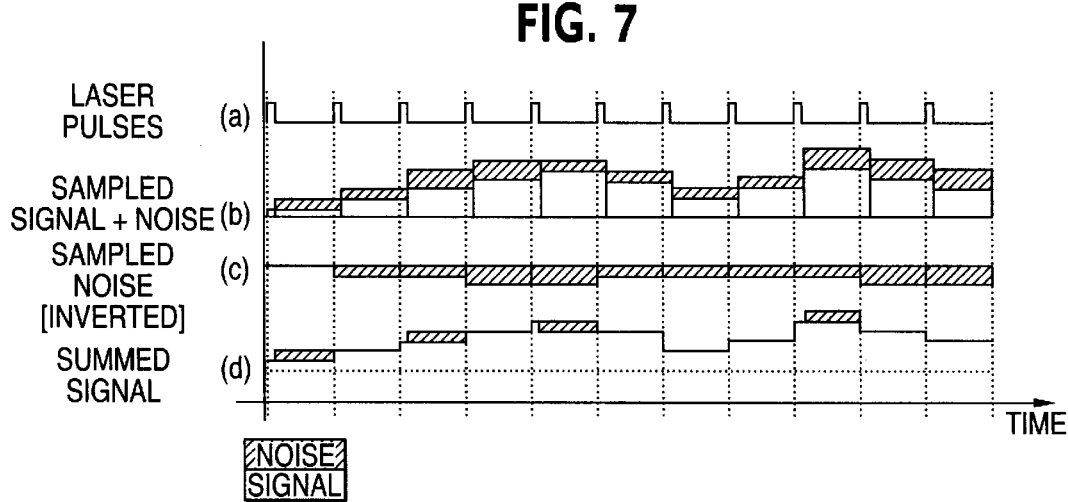
FIG. 7 is timing diagram illustrating the operation of the bar code scanner system of FIG. 6.
Figure 8:
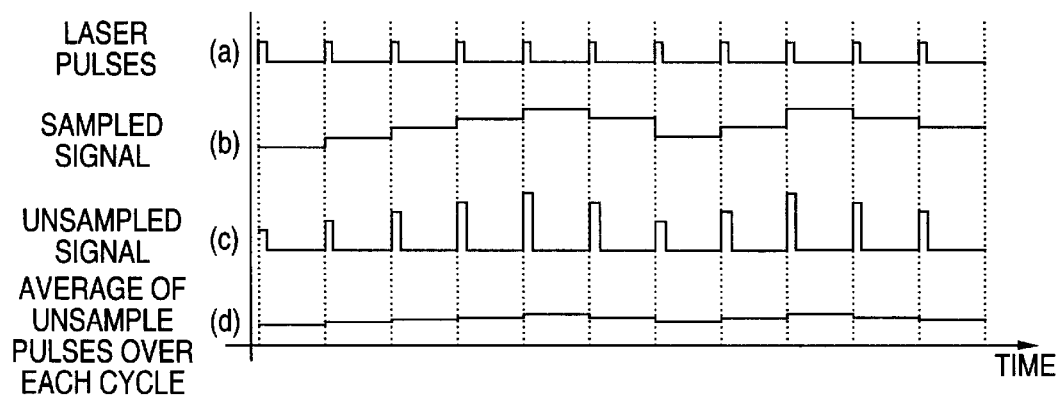
FIG. 8 is a timing diagram further illustrating the operation of the bar code scanner system of FIG. 6.
Figure 9:
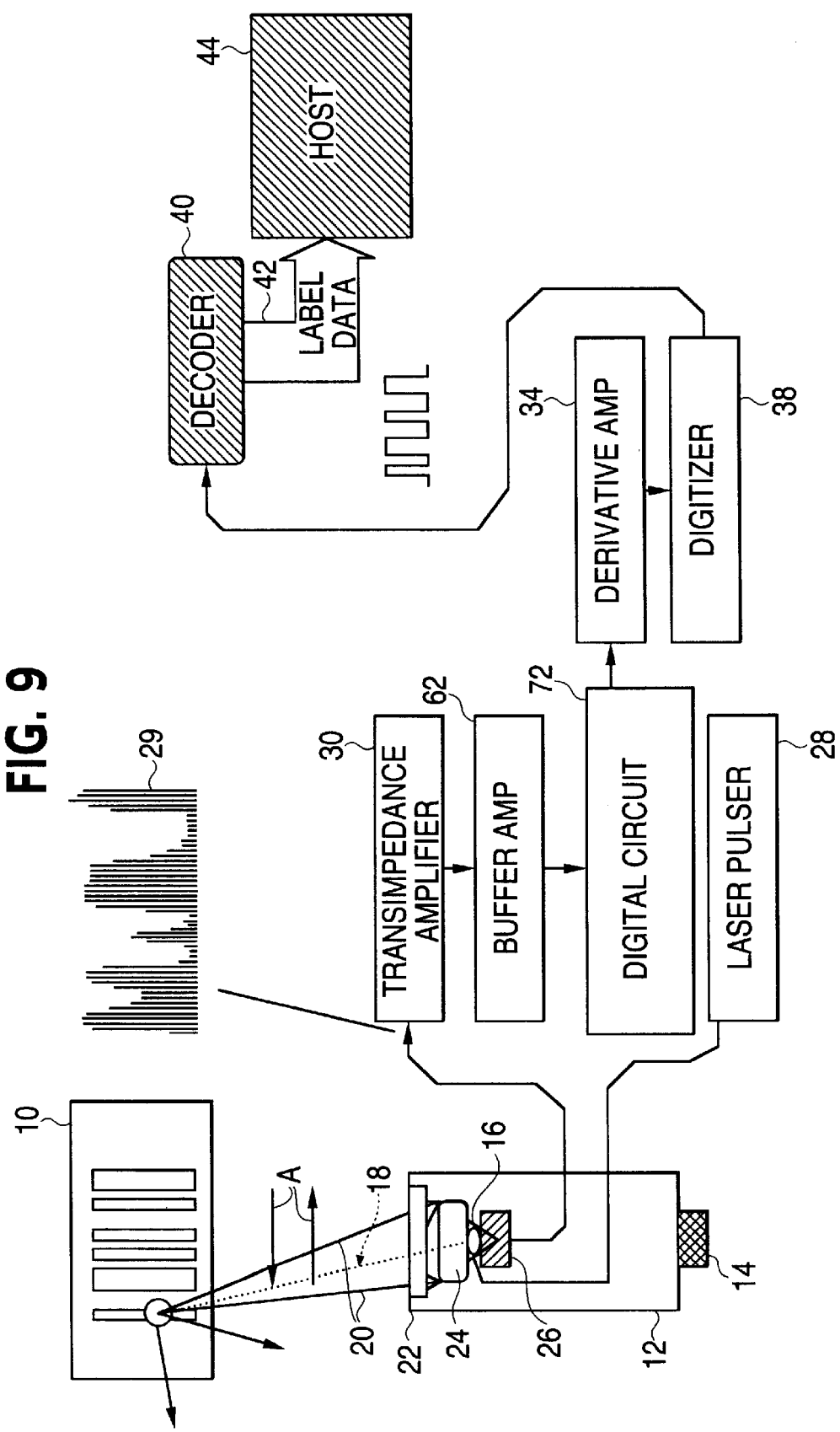
FIG. 9 is block diagram of a digital implementation of a bar code scanner.

In the first embodiment, one of the light sources may operate in either a continuous mode or in a pulsed mode. In the pulsed mode, each light output/receiving system of the scanner may have a structure as shown in FIG. 6, but where the transimpedance amplifier, sample and hold stages, and filter gain stages would be tuned to the light source modulation frequency (e.g., filter tuned to f1 for receiver tuned to the first source and filter tuned to f2 for receiver tuned to the second source). A further level of synchronization can be accomplished by choosing the modulation frequencies and phase synchronization such that the sources are not 'on' at the same time. For example, f2 could be set equal to f1*10. One source could be pulsed at a rate f1 at a duty cycle of 20% ON, 80% OFF. The second source could then be pulsed at the same or a different duty cycle completely within one of the 'OFF' intervals of f1 during which no sampling would be done for the receive channel corresponding to f1. In this configuration, the ambient noise sampled during the laser 'off' times would be identical for both sources. In a sense, this scanner synchronizes the multiple sources to achieve a form of 'time multiplexing' of multiple signals on one information channel. Thus, the benefits of time and frequency multiplexing would be available in such a system.

Figure 12:
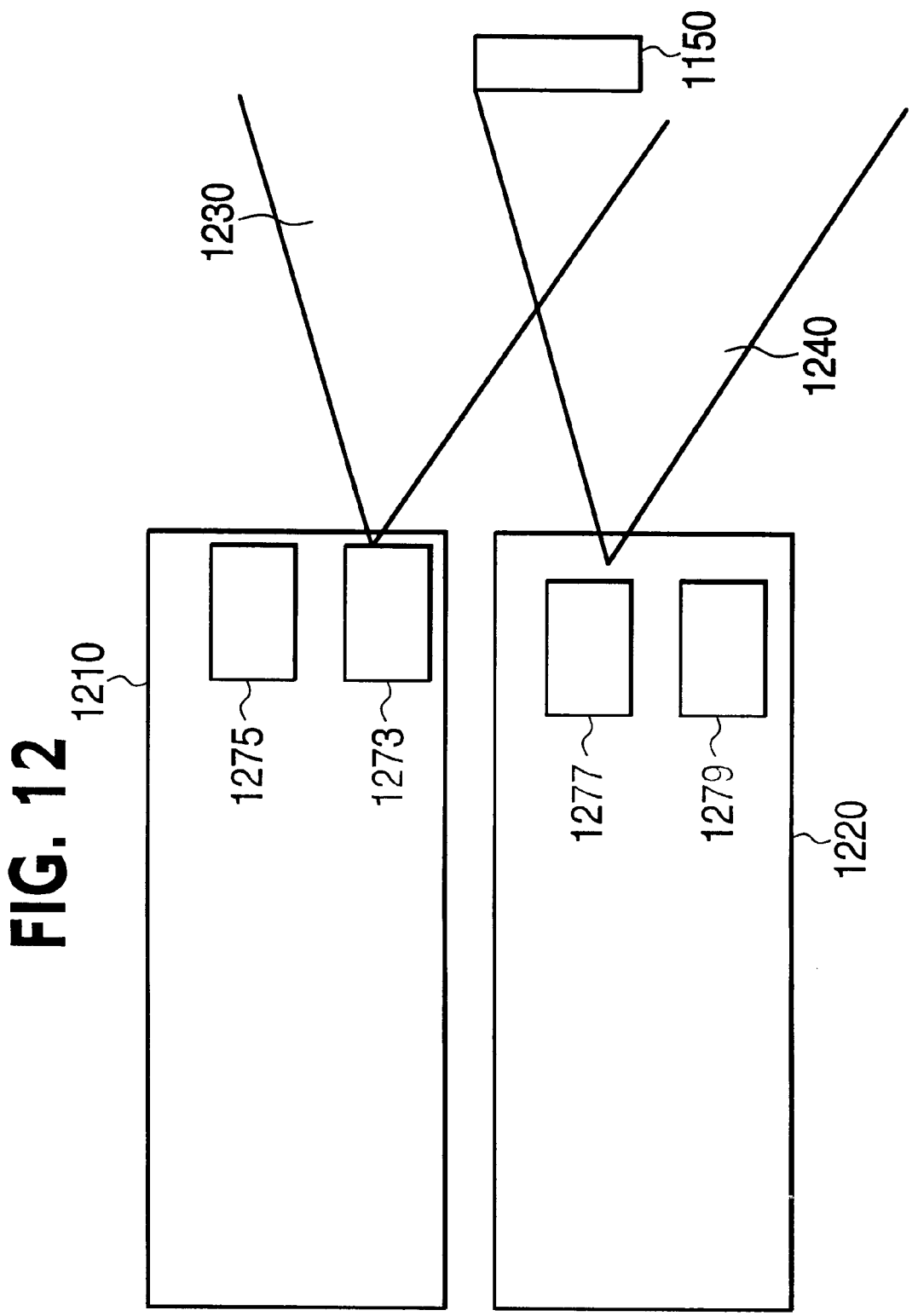
FIG. 12 is a block diagram of an optical scanner according to a second embodiment of the invention.

In a second, multiple scanner embodiment, a first scanner operates at a first frequency f1, with a receiver tuned to receive return light at the frequency f1. The second embodiment also includes a second scanner operating at a second frequency f2 different from the first frequency, with a receiver tuned to receive return light at the frequency f2. With such a configuration, as shown in FIG. 12, the first and second scanners 1210, 1220 can operate in the same field of view, or in different field of views 1230, 1240. In the second embodiment, the light received by a receiver 1275 at the first scanner 1210 that is due to light output from a light source 1277 of the second scanner 1220 is filtered out as noise. The same holds true for the light output from a light source 1273 of the first scanner 1210 with respect to a receiver 1279 of the second scanner 1220.

Noise reduction may also be achieved by a bar code scanner according to a third embodiment of the invention. The third embodiment was developed based on the knowledge that many artificial light sources are modulated at frequencies that significantly reduce the signal-to-noise ratio of the optical scanning system, thereby resulting in a loss in performance. These frequencies are not based on any particular standards, so it may be desirable to vary the modulation frequency used in an optical scanning system, depending upon the particular environment that the optical scanning system is being used. In addition, changes in technology may enable development of artificial light sources at modulation frequencies that are different than the frequencies found in currently available light sources (e.g., fluorescent light sources). Ambient noise may be caused not only by illumination, but also electromagnetic interference such as that generated by high frequency switching power supplies found in certain artificial lighting and video displays. The receive circuitry described in each of the embodiments is also effective in rejecting bandwidth limited electrical noise from these sources.

In the third embodiment, laser modulation that reduces the impact of undesirable ambient light noise provides for an adjustable/programmable system, in which, if the modulation frequency of the ambient light environment is known or can be measured, then the frequency of the laser light source can be changed via either a hardware or a software configuration to improve noise reduction through frequency separation using electrical filters or the like. If the spectral characteristics of the ambient light are known, then the laser light source may be set to operate at a particular modulation frequency that provides for high signal-to-noise ratio and thus obtain a high decoding efficiency. For example, if the ambient light is such that it is determined to have a spectral component at 55 kHz and a spectral component at 27.5 kHz, then the laser light source can be provided to have an output frequency modulation value of 500 kHz.

In the third embodiment, the ambient light analysis can be done off-line during a specification (set-up) or installation phase, depending on whether the pulse frequency could be adjusted in the field or needed to be set at the factory. Alternatively, it can be done in a real time adaptive system.

Figure 13:
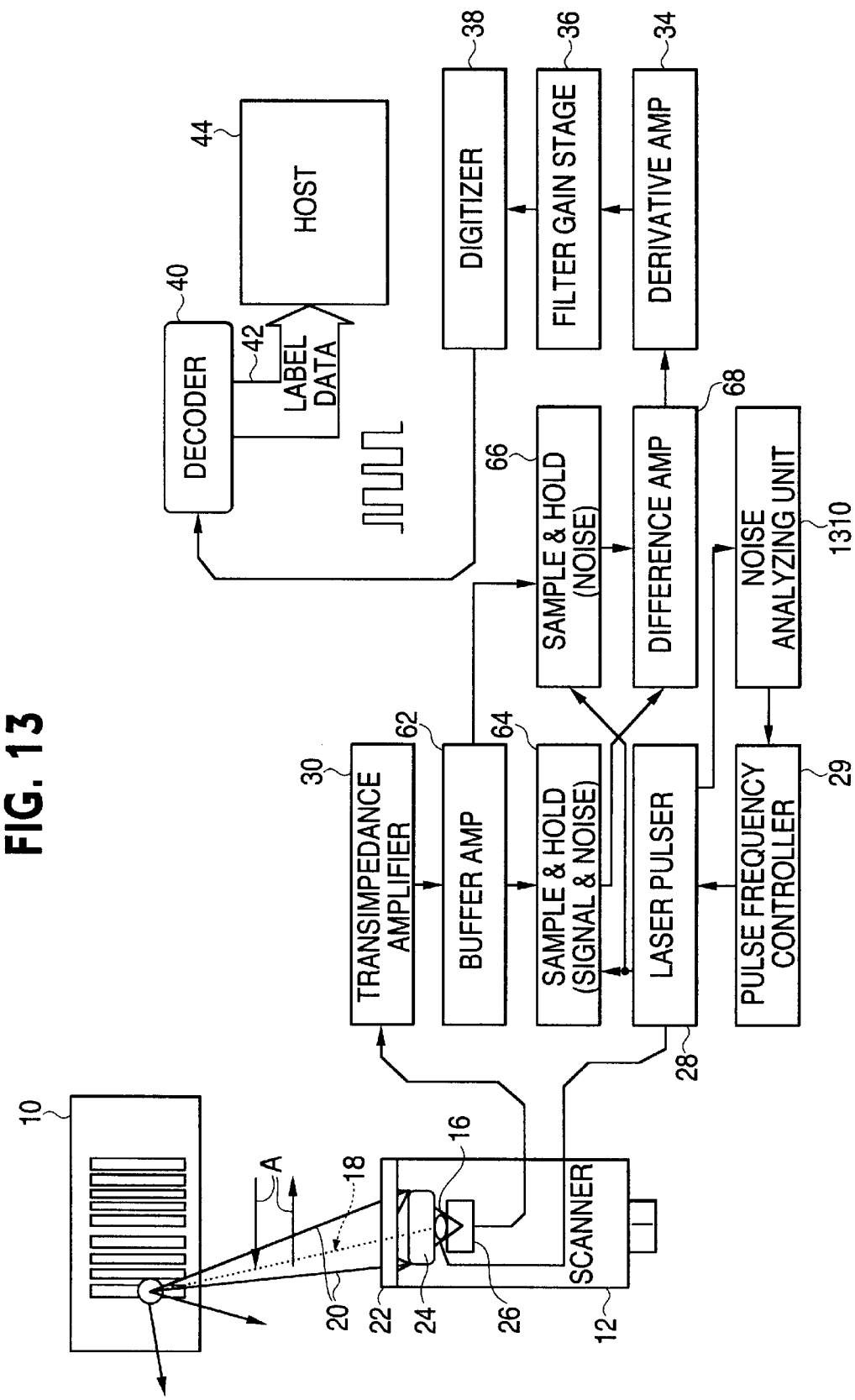
FIG. 13 is a block diagram of an optical scanner according to a third embodiment of the invention.

As shown in FIG. 13, the third embodiment utilizes a noise analyzing unit 1310, which is preferably a stand-alone device, and which receives ambient light and other sources of noise-like light energy. The noise analyzing unit 1310 determines the characteristics of the received noise, such as its frequency spectrum that is determined based on an FFT analysis, for example. The noise is measured during "off"

periods of the laser pulser 28, as determined based on an on/off signal provided to the noise analyzing unit 1310 by the laser pulser 28. Based on such a determination, a signal that includes information related to the characteristics of the ambient light and other sources of light-band noise is sent from the noise analyzing unit 1310 to a pulse frequency controller 29. Based on this information, the laser source 1320 is controlled such that the frequency of the output laser light is not within the dominant frequency range of the noise. Preferably, the frequency of the output laser light is not within any band in which noise is measured. Upon determining its operating frequency, the light receiving and decoding portion of the apparatus is set to detect received light synchronously with the pulsing of the laser as controlled by the frequency and duty cycle of the laser pulser 28.

The setting of the frequency of the laser pulser 28 is preferably done during installation based on information obtained from the operating environment. For example, the noise in the operating environment is determined by the noise analyzing unit 1310, which is only utilized during this installation (or set-up) mode, and once the optical scanner has been set to output light and receive light at a relatively noise-free operating frequency, the noise analyzing unit 1310 is no longer needed, and may be disconnected from the optical scanner of the third embodiment. The setting of the operating frequency of the laser pulser 28 may be done either by hardware (e.g., switches) or by software. That is, the pulse frequency counter 29 may be implemented either by hardware or software.

Figure 14:
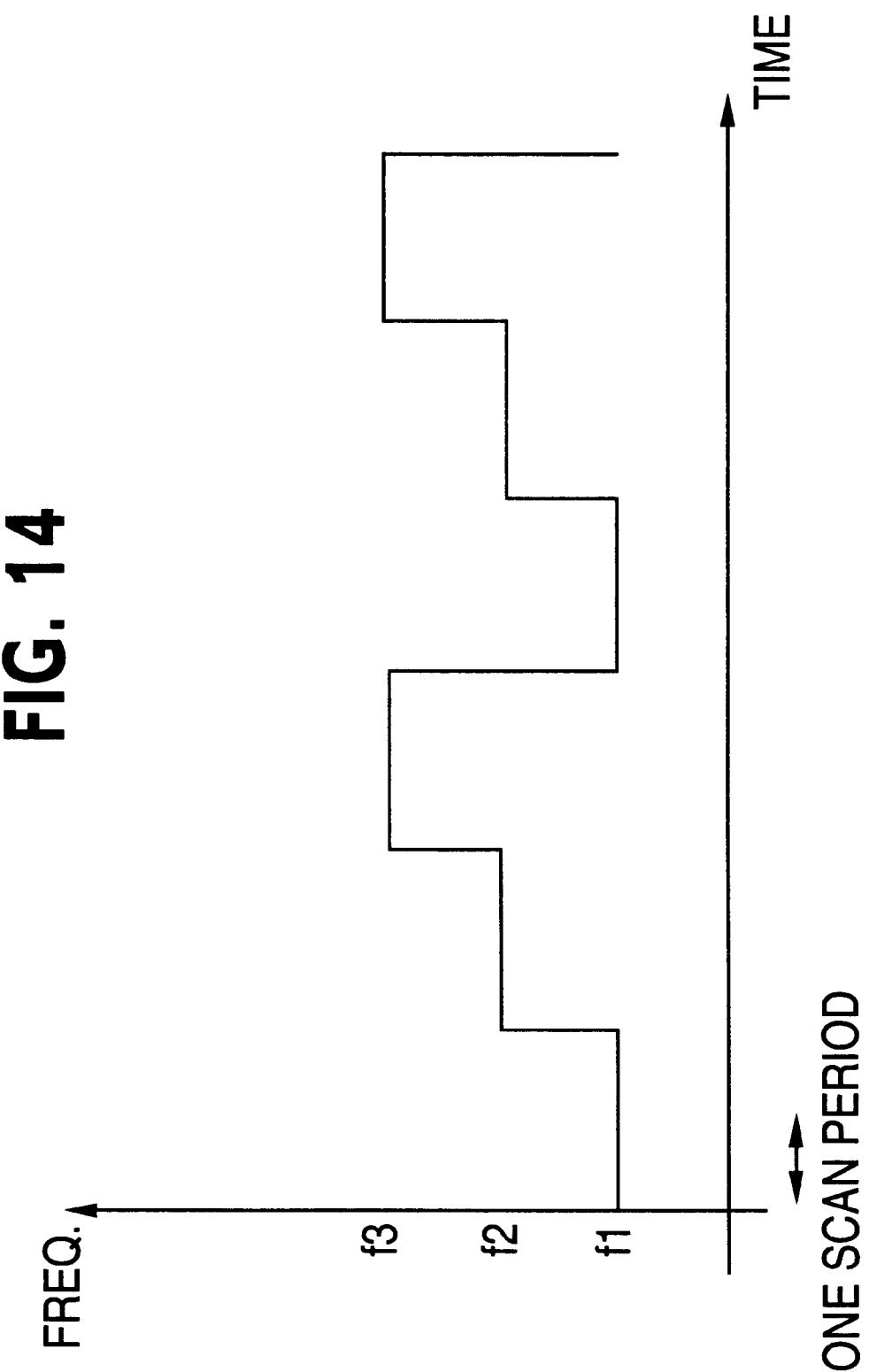
FIG. 14 is a plot of laser light source modulating frequency that varies in accordance with a fourth embodiment of the invention.

A fourth embodiment of laser modulation that can reduce the impact of undesirable ambient light provides for an open loop control system, in which, in an unknown ambient environment, the modulation frequency of the laser light source is changed according to multiple predetermined frequencies and/or duty cycles. One example would be the use of a "chirp-like" pattern, in which the frequency of the laser light modulation is altered between scans in a predetermined manner. For example, a scanner may modulate one or more scans at frequency f1, then switch to a modulation frequency of f2 for one or more successive scans, switch to a frequency of f3 for one or more successive scans, and then switch back to frequency f1, repeating the pattern until a successful read occurs. In this example, f1<f2<f3. FIG. 14 shows a plot of these three frequencies over time, resulting in a step-like output that is similar in some respects to a chirp-like signal.

At the receive side, the signal-to-noise ratio may be different for different scans due to the different transmit modulation frequencies used, where the signal-to-noise ratio would be highest for the scans when the frequency separation is greatest between the ambient light frequency and the transmit modulation frequency. Thus, if the ambient light frequency is 100 kHz, f1=100 kHz, f2=200 kHz, and f3=500 kHz, the best signal-to-noise ratio at the receive side would be achieved for the case where the modulation frequency was f3, and the worst signal-to-noise ratio would be achieved for the case where the modulation frequency was f1.

Figure 15:
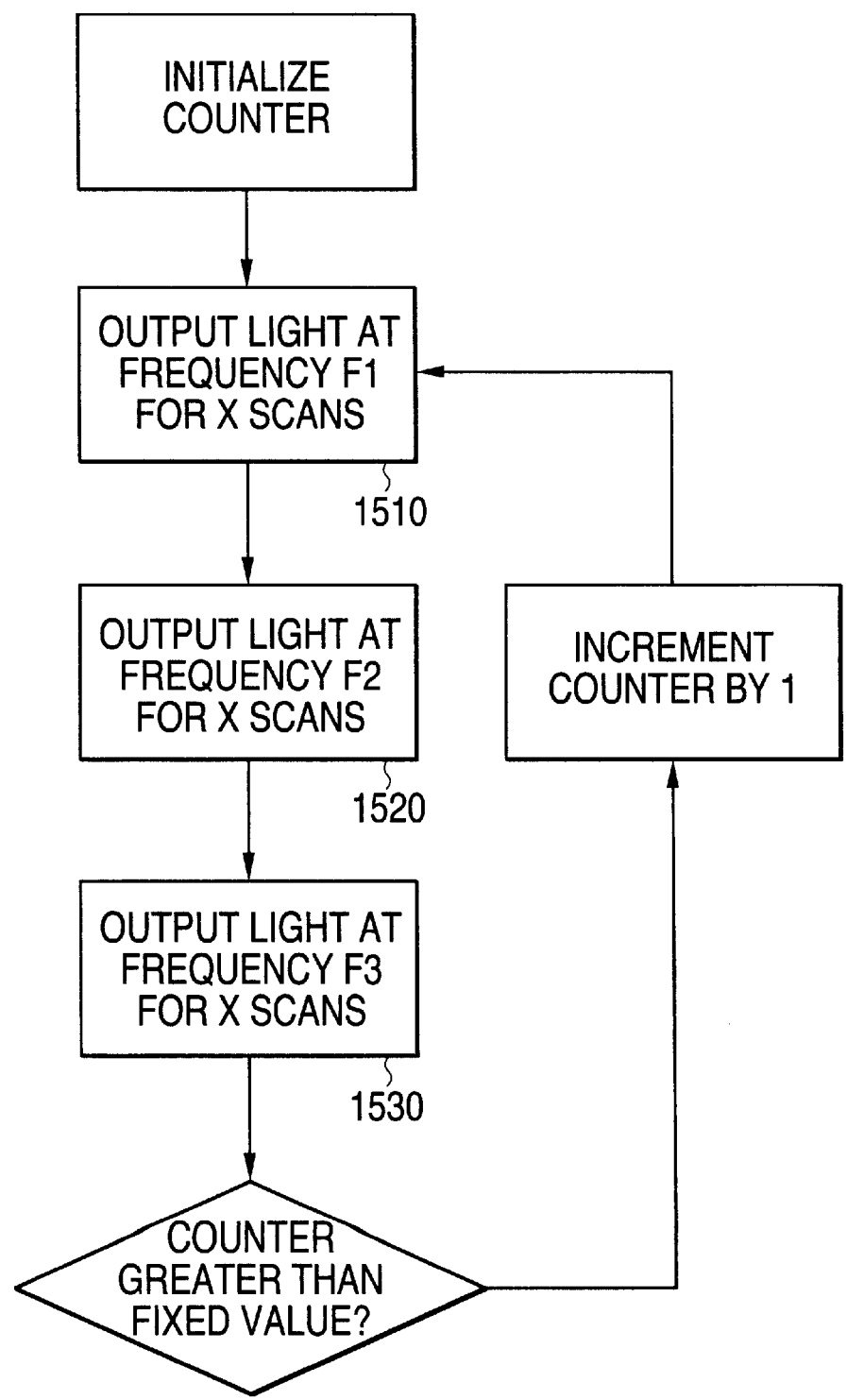
FIG. 15 is flow chart describing the varying of the laser light source according to the fourth embodiment.

A flow diagram explaining the fourth embodiment is shown in FIG. 15. In a step 1510, a laser source outputs light at a first frequency f1 for a predetermined number of scans. In a step 1520, the laser source outputs light at a second frequency f2 for the predetermined number of scans. In a step 1530, the laser source outputs light at a third frequency f3 for the predetermined number of scans. After the step 1530, the flow goes back to the step 1510, and repeats for a fixed number of times (say 3, for example) or indefinitely. In this example, a known object, such as a known bar code, is within the field of view during each scan.

A receiver is tuned to the operating frequency of the laser source for each scan, and receives both laser light and ambient light during each of these scans, and decodes the return light to obtain a digitized version of the bar code. In this manner, the receiver operates synchronously (both in a time and a frequency sense) with respect to the laser source. In the fourth embodiment, unlike the third embodiment, no analysis of noise is performed.

Figure 16:
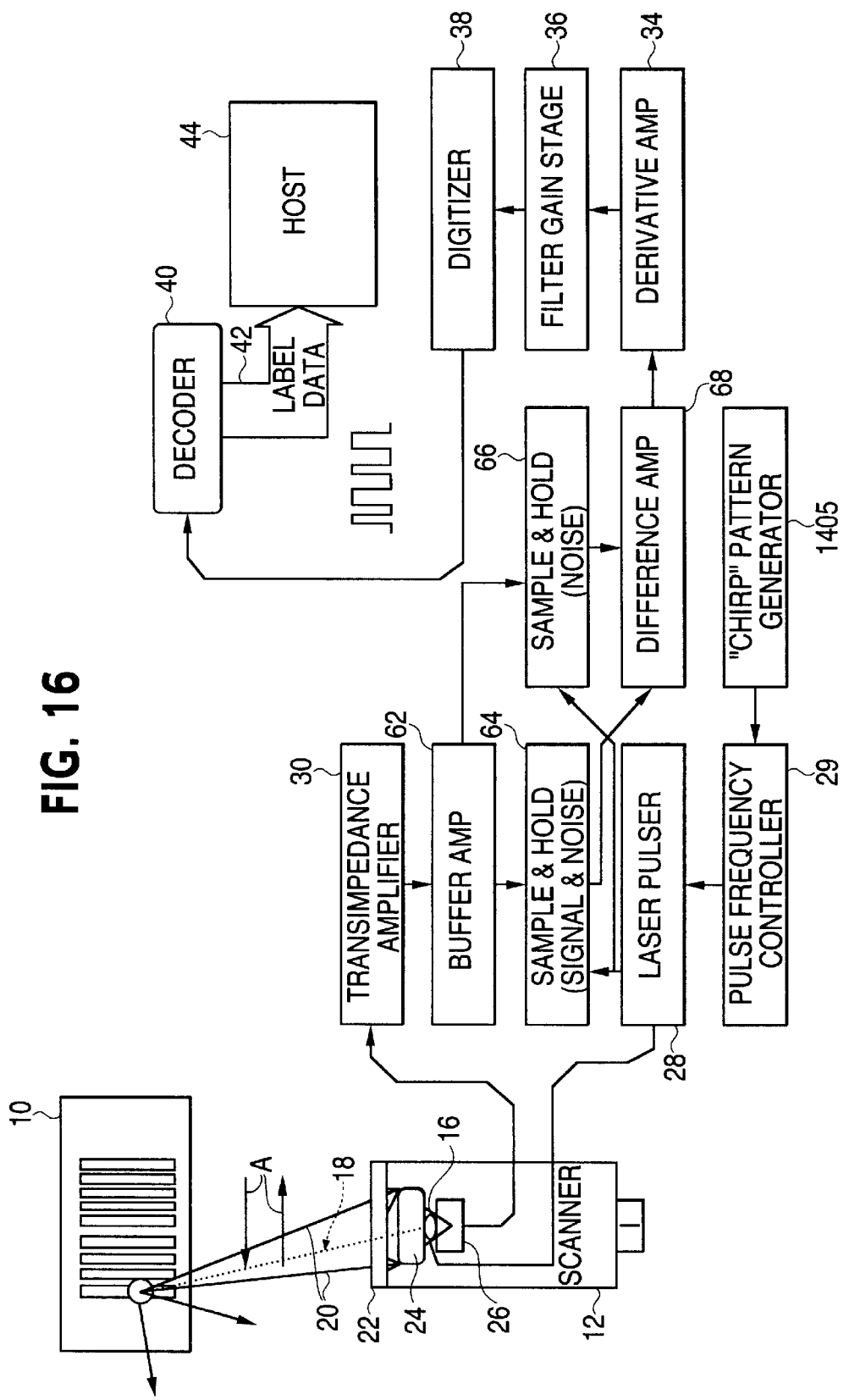
FIG. 16 is a block diagram of an optical scanner according to a fourth embodiment of the invention.

A block diagram of one possible configuration of an optical scanner according to the fourth embodiment is shown in FIG. 16. In FIG. 16, a "chirp-like" pattern generator 1405 provides a chirp-like signal to a pulse frequency controller 29. The pulse frequency controller 29 sends control signals to the laser pulser 28 to operate the laser pulser 28 in a "chirp-like" mode.

A fifth embodiment corresponds to an adaptive closed loop system with indirect feedback, in which a decoder provides feedback to the laser pulse controller, and where the laser pulser's output frequency is operated according to a predetermined algorithm (as in the fourth embodiment), but where the laser pulser optimizes its output frequencies based on the information received from the decoder. In the fifth embodiment, the operating frequency of the laser pulser 28 changes during scanning based on an indirect feedback path from the decoder.

Figure 17:
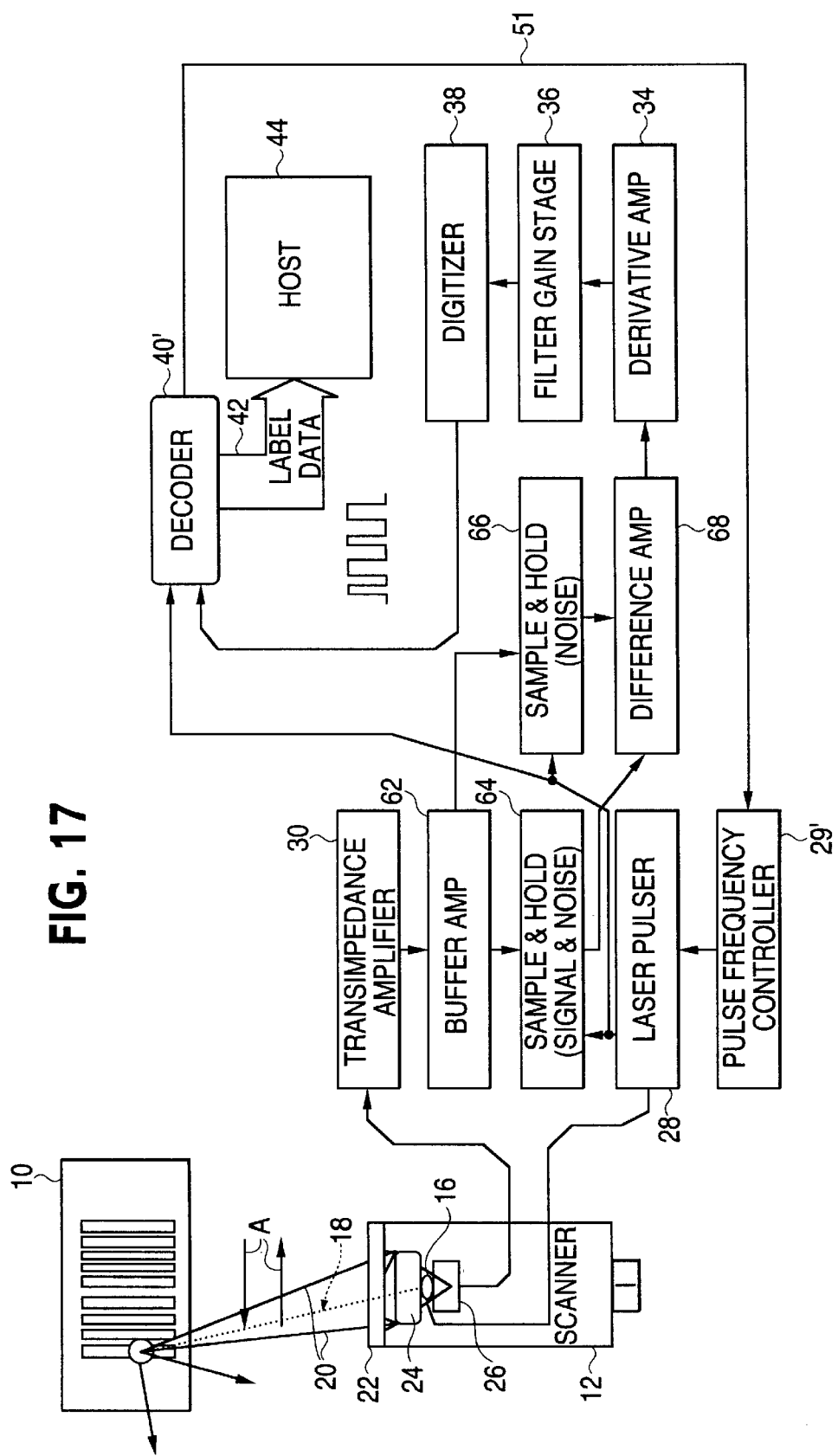
FIG. 17 is a block diagram of an optical scanner according to a fifth embodiment of the invention.

Referring now to FIG. 17, a decoder 40' is communicatively coupled to a pulse frequency controller block 29 by way of a bidirectional communications channel 51. Although communications channel 51 is shown as bidirectional, it need not be so, since the only requirement is that the decoder provides data of decode percentage by frequency value to the laser pulser controller. As shown in FIG. 17 and described below, the freq. info is input to the decoder via an output from the laser pulser. Over the channel 51, the decoder 40' provides the pulse frequency controller block 29 with information on its success in decoding received information, which the pulse frequency controller 29 block utilizes in order to control the laser pulser 28 to weight its operation at particular output frequencies accordingly.

In the fifth embodiment, the decoder 40' tracks the laser pulser output frequency for each successful decode, with that pulse frequency information being provided to the decoder 40' by the laser pulser 28 itself. As one example, assume that the decoder 40' determines that 70% of the decodes occurred during frequency f1, 25% occurred during frequency f2, and 5% occurred during frequency f3 (with the laser pulse operating at each of these frequencies for a same amount of time for each "chirp-like" cycle). The decoder 40' would then send signals to the pulse frequency controller 29' that include this information, and the pulse frequency controller 29' would control the laser pulser 28 such that scanning would occur more of the time at frequency f1 (due to the success rate in decoding at that frequency), and the least amount of time at frequency f3 (due to the worst success rate in decoding at that frequency), with the amount of time at frequency f2 being between these two amounts of time. As one example, the laser pulser 28 may be commanded to operate at frequency f1 for 7 successive scans, then at f2 for 3 successive scans, with no scans at f3, with this sequence being repeated during the operation mode of the scanner.

Figure 1:
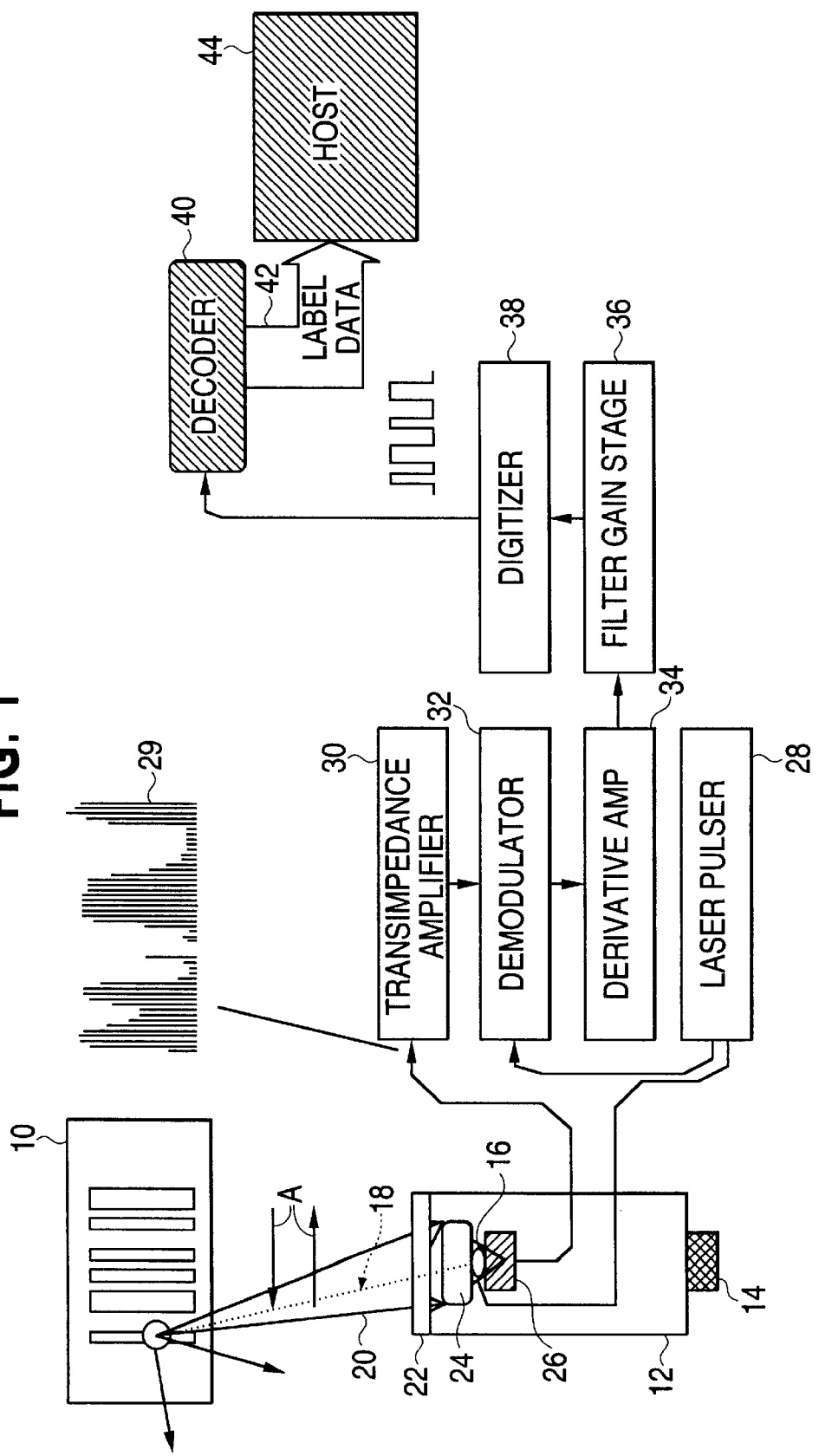
FIG. 1 shows a bar code scanner system that reduces noise via pulsing of a laser and commensurate pulsing of a receiver portion.
Figure 2:
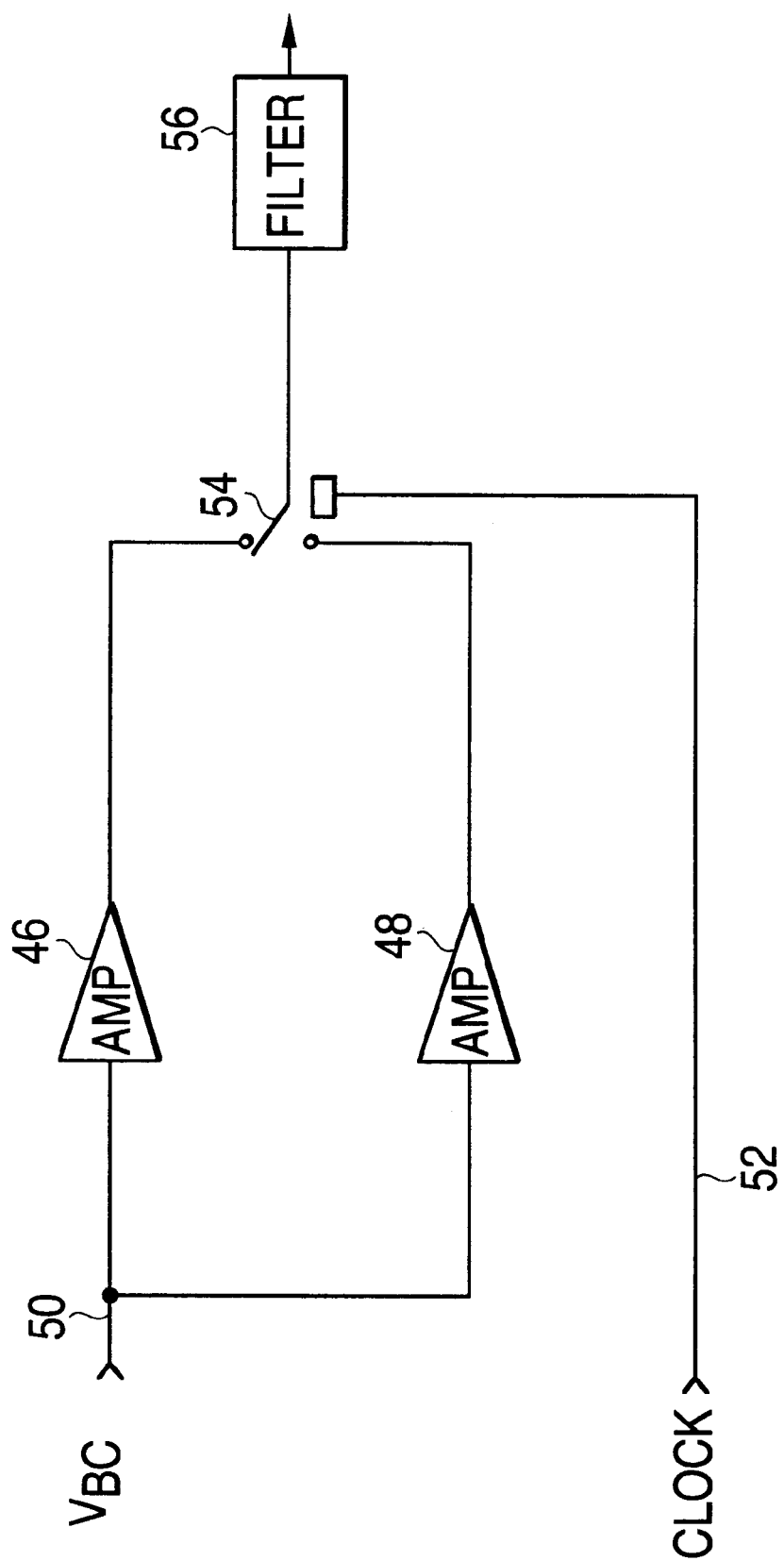
FIG. 2 is a schematic diagram of a demodulator circuit that may be used in the system of FIG. 1.
Figure 3:
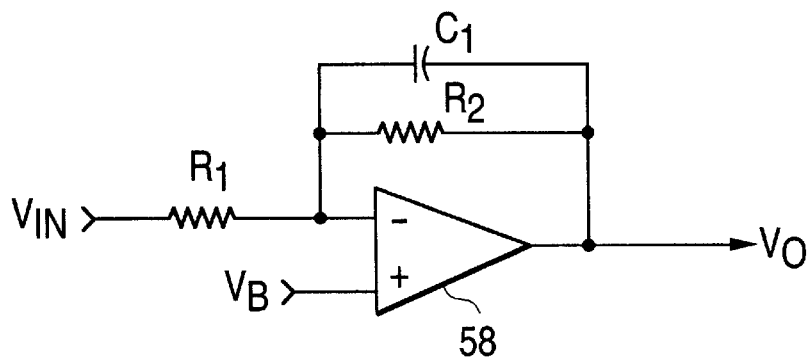
FIG. 3 is a schematic diagram of an analog filter that may be used in the system of FIG. 1.
Figure 4:
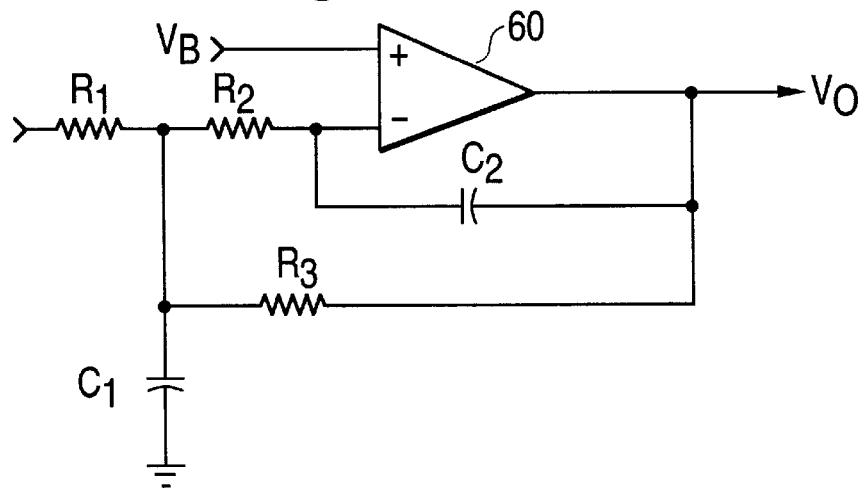
FIG. 4 is a schematic diagram of another analog filter that may be used in the system of FIG. 1.
Figure 5:
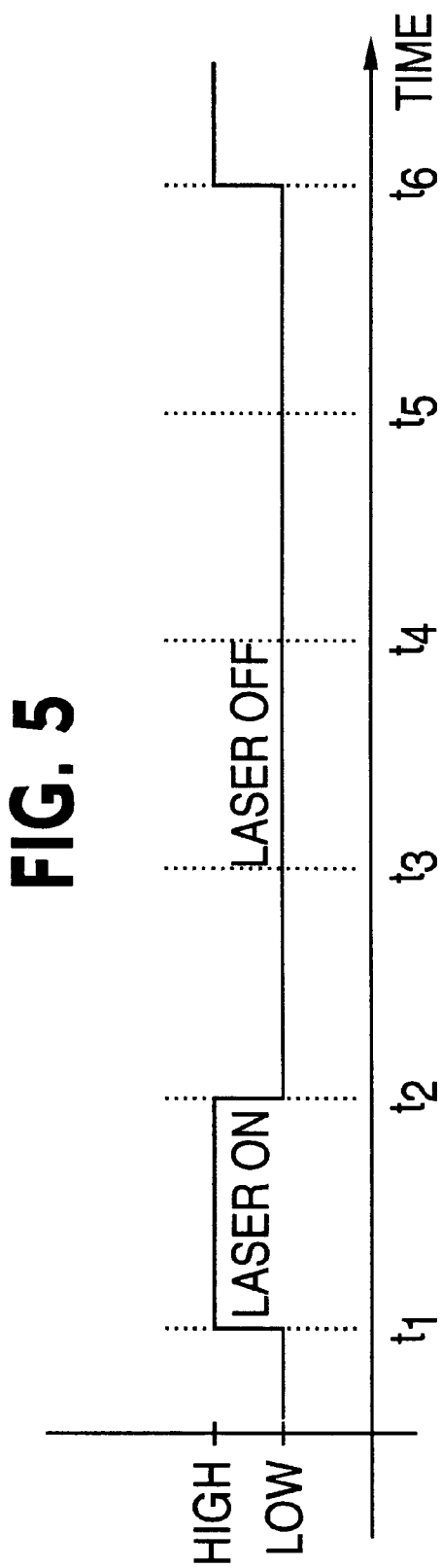
FIG. 5 is a timing diagram illustrating one possible duty cycle of the laser light source shown in FIG. 1.

A sixth embodiment corresponds to an adaptive closed loop system with direct feedback, in which, during periods when the laser pulser is "off", the scanner samples and determines the frequency of the dominant sources of ambient light. Referring now to FIG. 5, this sampling may correspond to any or all of the time intervals between t2 and t3, t3 and t4, t4 and t5 or t5 and t6. Thus, if ambient light is being received from three separate sources having respective modulation frequencies of f10, f11, and f12, the total amount of the received ambient light is processed to determine the dominant source of that light. For example, that dominant source of ambient light may be determined to be f11, due to a high intensity level of ambient light at that frequency. Based on this determination, on successive scans, the modulation frequency of the transmit laser light is changed to maximize the frequency separation between the laser light and the ambient noise, thereby maximizing the signal-to-noise ratio for that particular operating environment.

Figure 10:
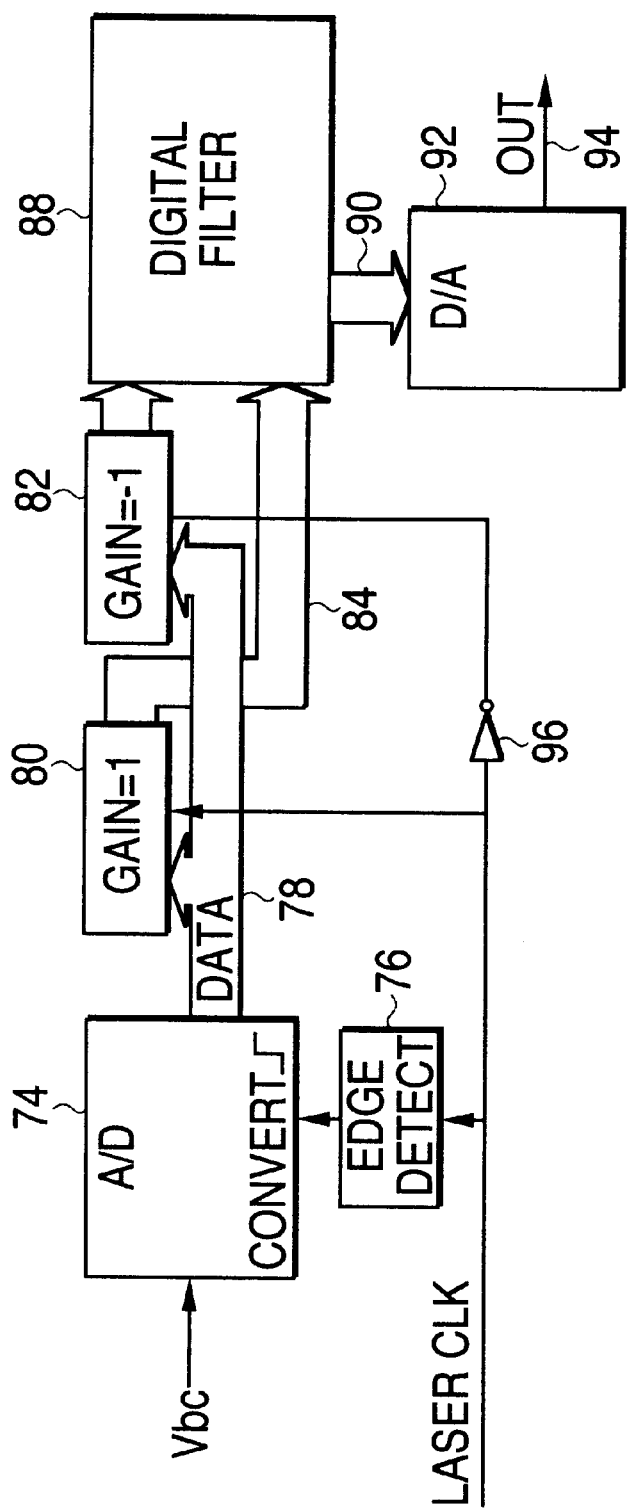
FIG. 10 is a block diagram of a digital demodulation/filter circuit that may be used in the system of FIG. 9.

Referring now to FIG. 10, the A/D converter 74 may be configured to convert a second received signal, which corresponds to a signal received during a laser "off" period (the signal received between two successive pulses), to at least one digital word. This digital word is input to a digital signal processor (DSP, not shown), which analyzes the dominant frequency of the ambient noise. This analysis may be performed, for example, using an FFT algorithm. The results of this frequency analysis are used as the basis for setting the modulation frequency of the laser light source for successive scans.

Figure 19:
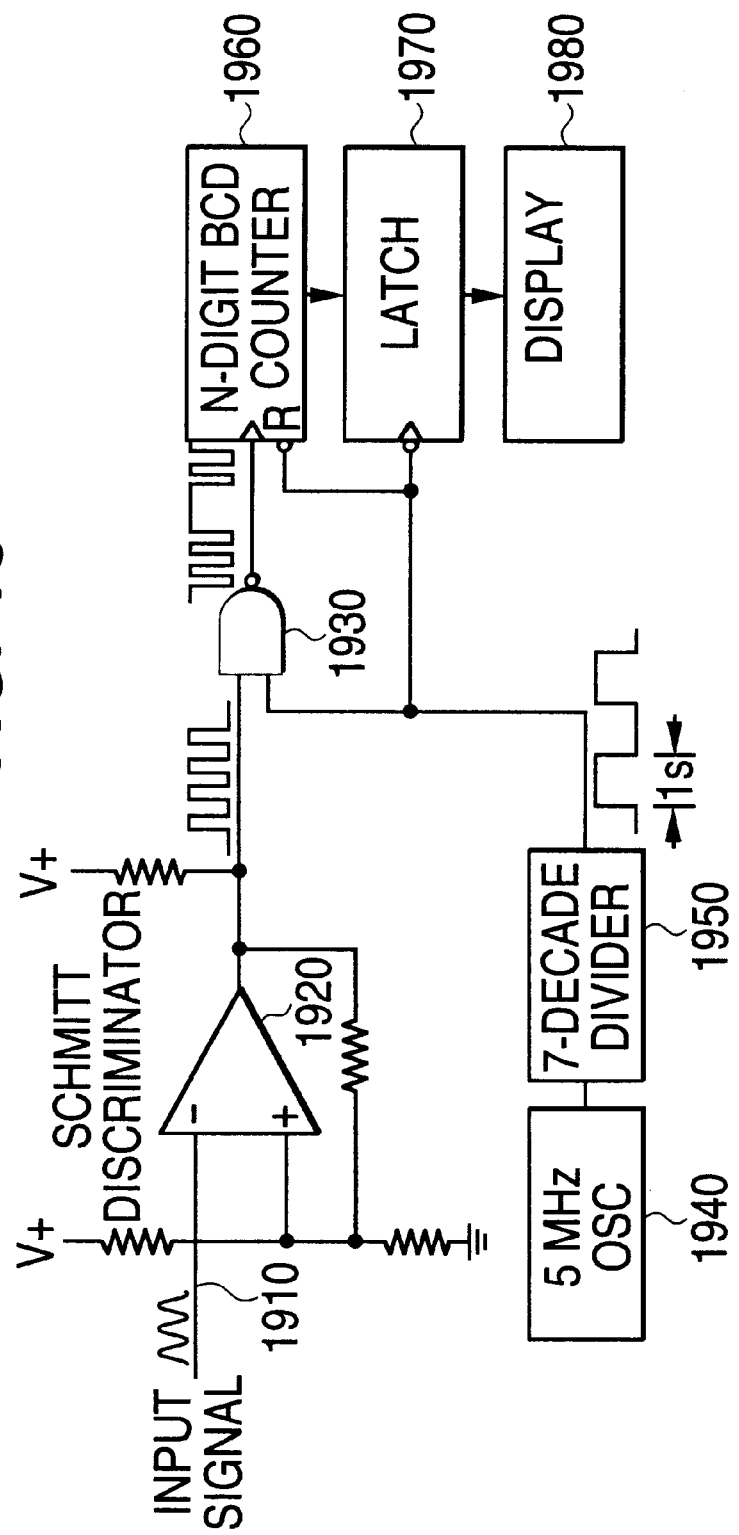
FIG. 19 is a block diagram of a discrete frequency measuring circuit that can be used in the embodiments that analyze noise.

Alternatively, the determination of ambient light frequency may be made without the use of an A/D converter or DSP, in which the received signal is provided to a frequency counter circuit that is shown in FIG. 19 and described below, which is configured to determine the frequency characteristics of a received analog signal.

Figure 18:
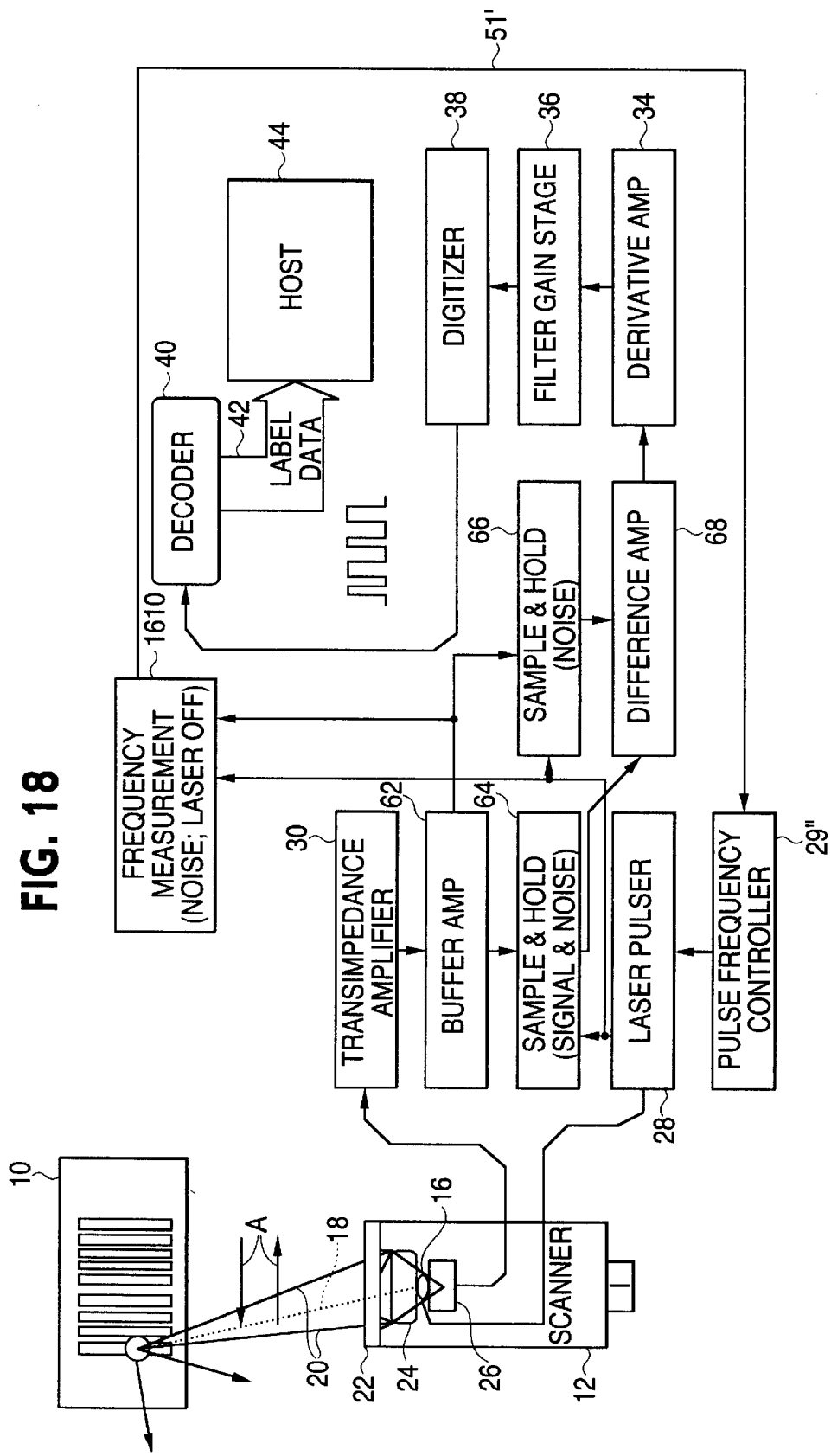
FIG. 18 is a block diagram of an optical scanner according to a sixth embodiment of the invention.

The sixth embodiment provides real time control based on direct measurement of the frequency content of the noise. FIG. 18 shows a block diagram of one possible configuration of an optical scanner according to the sixth embodiment. A frequency measurement unit 1610 measures the content of noise (e.g., ambient light, electromagnetic interference, etc.) during "off" times of the laser pulser 28 (due to an on/off indicating signal being provided to the frequency measurement unit 1610 by the laser pulser 28). As discussed above, the frequency measurement unit 1610 may be a DSP, or it may be a digital timer or an analog measurement circuit. One example of a discrete frequency measurement circuit, which is different from the DSP with integrated A/D converter described above, is provided in FIG. 19. An input signal 1910 is provided to a Schmitt discriminator 1920, with the other input to the Schmitt discriminator 1920 being provided with a reference voltage V+. The Schmitt discriminator 1920 digitizes the input signal 1910 by converting it to digital pulses. The output of the Schmitt discriminator 1920 is provided to one input of a NAND gate 1930, with the other input of the NAND gate 1930 being provided with a pulse train as provided by way of an oscillator circuit 1940 and a divider circuit 1950, which provide a reference counter pulse train. The output of the NAND gate 1930 is provided to a clock input of an n-digit BCD counter circuit 1960, with the output of the BCD counter 1960 provided to a latch 1970. The latch 1970 is clocked based on the signal output from the divider circuit 1950. The information stored in the latch 1970 may be output onto an optional display 1980 for viewing by an operator (although operator-interaction is not required in this embodiment), and which provides a frequency count value indicative of the frequency of the input signal 1910, and where the output of the latch 1970 is communicated to the laser pulse controller. Alternatively, the digitized signal output of the Schmitt discriminator 1920 can be input to one or more timers that are integrated with a microcontroller, in which the frequency measurement can be accomplished with relatively simple algorithms.

In FIG. 18, assume that the pulse frequency controller 29" can control the laser pulser 28 to operate at either f1, f2 or f3 at any given time (or scan). During laser "off" time, noise is analyzed by the frequency measurement unit 1610, and information as to its dominant frequency range is sent to the pulse frequency controller 29" by way of a communications path 51' between the frequency measurement unit 1610 and the pulse frequency controller 29". For example, assume that the frequency measurement unit 1610 sends a signal to the pulse frequency controller 29" in which f1 is determined to be the dominant frequency of the measured noise. With this information, the pulse frequency controller 29" determines an operating frequency that is furthest from this frequency. If f1<f2<f3, the pulse frequency controller 29" will control the laser pulser 28 to operate at frequency f3 in its pulsed operation. This process repeats during the operation mode of the optical scanner according to the sixth embodiment, with any changes in the measured noise environment being provided to the pulse frequency controller 29" by the frequency measurement unit 1610. Based on any changes in the noise environment, the optical scanner may adapt to operate at a different operating frequency (of the output light) for the laser pulser 28. In a relatively noise-free environment, the controller may choose the frequency that optimizes reading performance or minimizes power consumption based on the system characteristics.

An alternative to the real-time control of the sixth embodiment provides for a bar code scanner system with a "learn" mode, in which the laser light source is turned off and the received signal is converted to digital words by an A/D converter, such as the A/D converter 74 shown in FIG. 10. The optical scanner may measure noise frequency over relatively long laser "off" times, such as during installation, and with the information obtained during these "off" times, the laser pulser will be set to an operating frequency of its output light that will not change during scanning operation. The digital words corresponding to the measured noise are input to a DSP or microcontroller to determine the dominant frequency characteristics of the received signal. The 'learn' mode would be employed during the installation and setup of the scanner, and would not occur during normal scanner operation. The results of this frequency analysis are used as the basis for setting the modulation frequency of the laser light source during scanning. Since the 'learn' mode is not time duration critical, this embodiment does not require the use of relatively high speed A/D converters and DSP processors that may be required to measure the frequency during the relatively short laser 'Off' intervals.

What is claimed is:
1. An optical scanning system, comprising:
   a laser pulser configured to output light at a predetermined duty cycle;
   a receiver configured to receive light at the predetermined duty cycle, the receiver including an ambient light measuring and analyzing unit for analyzing received ambient light during an off time of the predetermined duty cycle,
   wherein the ambient light measuring and analyzing unit outputs a signal to the laser pulser that includes information as to characteristics of the received ambient light, and
   wherein the laser pulser operates at a modulating frequency that is separate from a frequency band of the received ambient light.

2. The optical scanning system according to claim 1, wherein the receiver further comprises a filter stage, and wherein the receiver is configured to receive a second signal from the laser pulser that includes information as to an operating modulating frequency of the laser pulser, and wherein the filter stage is set to receive signals only at a fixed range that is centered around the operating modulating frequency.

3. An optical scanning system for scanning a known object, comprising:

a light unit that is configured to output light having a modulation frequency that varies in a predetermined manner in an initialization mode of the optical scanning system, the output light being sent in a direction towards the known object; and a receiver unit that is configured to receive light reflected off the known object due to the output light impinging on the object, and to receive ambient light and/or electromagnetic interference noise, wherein the receiver unit is configured to determine a signal-to-noise ratio of the receive light and to determine a highest signal-to-noise ratio, and wherein a particular modulation frequency of the light unit that corresponds to the highest signal-to-noise ratio is utilized by the light source of the optical scanning system, so that the light unit outputs light only at the particular modulation frequency during a normal operating mode of the optical scanning system.

4. The optical scanning system according to claim 3, wherein the modulation frequency varies in a stepwise manner to produce a chirp signal, and wherein the light unit and the receiver unit operate synchronously with respect to each other.

5. An optical scanning system, comprising:

a light unit that is configured to output light having a modulation frequency that varies in a predetermined manner over a predetermined time interval, the output light being sent in a direction towards an object to be optically scanned; and a receiver unit that is configured to receive light reflected off the object due to the output light impinging on the object, and to receive ambient light, wherein the receiver unit is configured to attempt to decode the receive light during the predetermined time interval.

6. An optical scanning system according to claim 5, wherein the receiver unit operates asynchronously with respect to the light unit.

* * * * *